(12) United States Patent
Zheng

(10) Patent No.: US 7,808,385 B2
(45) Date of Patent: Oct. 5, 2010

(54) INTERACTIVE CLOTHING SYSTEM

(75) Inventor: Yu Zheng, Walnut, CA (US)

(73) Assignee: Patent Category Corp., Walnut, CA (US)

( * ) Notice: Subject to any disclaimer, the term of this patent is extended or adjusted under 35 U.S.C. 154(b) by 280 days.

(21) Appl. No.: 11/726,454

(22) Filed: Mar. 22, 2007

(65) Prior Publication Data

US 2007/0198121 A1    Aug. 23, 2007

Related U.S. Application Data

(63) Continuation-in-part of application No. 11/540,369, filed on Sep. 29, 2006, which is a continuation-in-part of application No. 11/368,300, filed on Mar. 3, 2006, which is a continuation-in-part of application No. 11/255,852, filed on Oct. 21, 2005, now abandoned.

(51) Int. Cl.
*G08B 13/14* (2006.01)

(52) U.S. Cl. ............... 340/572.1; 340/572.4; 340/572.7; 340/539.13; 340/539.26

(58) Field of Classification Search ............. 340/572.1, 340/572.4, 572.7, 539.13, 539.26
See application file for complete search history.

(56) References Cited

U.S. PATENT DOCUMENTS

| | | | |
|---|---|---|---|
| 4,712,184 A | 12/1987 | Haugerud | |
| 4,770,416 A | 9/1988 | Shimizu et al. | |
| 5,026,058 A | 6/1991 | Bromley | |
| 5,119,104 A * | 6/1992 | Heller | ......................... 342/450 |
| 5,212,368 A | 5/1993 | Hara | |
| 5,271,627 A | 12/1993 | Russell et al. | |
| D354,532 S | 1/1995 | Tornquist et al. | |
| 5,379,461 A | 1/1995 | Wilmers | |
| 5,411,259 A | 5/1995 | Pearson et al. | |
| 5,499,017 A * | 3/1996 | Beigel | ..................... 340/572.1 |
| 5,575,659 A | 11/1996 | King et al. | |
| 5,607,336 A | 3/1997 | Lebensfeld et al. | |
| 5,686,705 A | 11/1997 | Conroy et al. | |
| 5,746,602 A | 5/1998 | Kikinis | |
| 5,749,735 A | 5/1998 | Redford | |
| 5,766,077 A | 6/1998 | Hongo | |
| 5,853,327 A | 12/1998 | Gilboa | |
| 5,877,458 A | 3/1999 | Flowers | |
| 6,012,961 A | 1/2000 | Sharpe, III et al. | |

(Continued)

FOREIGN PATENT DOCUMENTS

EP        1 486 237        12/2004

(Continued)

OTHER PUBLICATIONS

European Search Report dated Jun. 6, 2007 for European Application No. 06021643.9.

(Continued)

*Primary Examiner*—Tai T Nguyen
(74) *Attorney, Agent, or Firm*—Raymond Sun

(57) ABSTRACT

An interactive clothing system includes a control unit having a processor and an antenna, and an item of clothing having a controller and a antenna. The antenna at the item of clothing communicates signals to the antenna at the control unit, the signals containing information about the item of clothing.

4 Claims, 4 Drawing Sheets

U.S. PATENT DOCUMENTS

| | | | |
|---|---|---|---|
| 6,022,273 A | 2/2000 | Gabai | |
| 6,056,618 A | 5/2000 | Larian | |
| 6,086,478 A | 7/2000 | Klitsner et al. | |
| 6,110,000 A | 8/2000 | Ting | |
| 6,135,845 A | 10/2000 | Klimpert et al. | |
| 6,201,947 B1 | 3/2001 | Hur | |
| 6,254,486 B1 | 7/2001 | Matheiu et al. | |
| 6,290,565 B1 | 9/2001 | Galyean, III et al. | |
| 6,290,566 B1 | 9/2001 | Gabai et al. | |
| 6,319,010 B1 | 11/2001 | Kikinis | |
| 6,319,087 B1 | 11/2001 | Ferrigno | |
| 6,357,566 B1 | 3/2002 | Pond | |
| 6,416,326 B1 | 7/2002 | Oh | |
| 6,460,851 B1 | 10/2002 | Lee et al. | |
| 6,478,679 B1 | 11/2002 | Himoto | |
| 6,497,606 B2 | 12/2002 | Fong | |
| D470,540 S | 2/2003 | Seelig et al. | |
| 6,546,436 B1 | 4/2003 | Fainmesser et al. | |
| 6,554,679 B1 | 4/2003 | Shackelford et al. | |
| 6,558,225 B1 | 5/2003 | Rehkemper et al. | |
| 6,585,556 B2 | 7/2003 | Smirnov | |
| 6,595,780 B2 | 7/2003 | Singh et al. | |
| 6,612,501 B1 | 9/2003 | Woll et al. | |
| RE38,286 E | 10/2003 | Flowers | |
| 6,648,719 B2 | 11/2003 | Chan | |
| 6,661,405 B1 | 12/2003 | Flowers | |
| 6,663,393 B1 | 12/2003 | Ghaly | |
| 6,668,156 B2 | 12/2003 | Lynch et al. | |
| 6,700,533 B1 * | 3/2004 | Werb et al. | 342/357.07 |
| 6,704,028 B2 | 3/2004 | Wugofski | |
| 6,719,604 B2 | 4/2004 | Chan | |
| 6,728,776 B1 | 4/2004 | Colbath | |
| 6,732,183 B1 | 5/2004 | Graham | |
| 6,733,325 B2 | 5/2004 | Sakai | |
| 6,750,765 B1 * | 6/2004 | van Wijk | 340/505 |
| 6,758,678 B2 | 7/2004 | Van Gilder et al. | |
| 6,761,637 B2 | 7/2004 | Weston et al. | |
| 6,773,325 B1 | 8/2004 | Mawle et al. | |
| 6,801,815 B1 | 10/2004 | Filo et al. | |
| 6,801,968 B2 | 10/2004 | Hunter | |
| 6,811,491 B1 | 11/2004 | Levenberg et al. | |
| 6,814,662 B2 | 11/2004 | Sasaki et al. | |
| 6,814,667 B2 | 11/2004 | Jeffway, Jr. et al. | |
| 6,877,096 B1 | 4/2005 | Chung et al. | |
| 6,949,003 B2 | 9/2005 | Hornsby et al. | |
| 7,033,243 B2 | 4/2006 | Hornsby et al. | |
| 7,035,583 B2 | 4/2006 | Ferringno et al. | |
| 7,054,949 B2 | 5/2006 | Jennings | |
| 7,073,191 B2 | 7/2006 | Srikantan et al. | |
| 7,096,272 B1 | 8/2006 | Raman | |
| 7,117,439 B2 | 10/2006 | Barrett et al. | |
| 7,118,482 B2 | 10/2006 | Ishihara et al. | |
| 7,120,653 B2 | 10/2006 | Alfieri et al. | |
| 7,131,887 B2 | 11/2006 | Hornsby et al. | |
| 7,319,397 B2 * | 1/2008 | Chung et al. | 340/572.4 |
| 2002/0028710 A1 | 3/2002 | Ishihara et al. | |
| 2002/0073084 A1 | 6/2002 | Kauffman et al. | |
| 2002/0111808 A1 | 8/2002 | Feinberg | |
| 2002/0125318 A1 | 9/2002 | Tatsuta et al. | |
| 2003/0148700 A1 | 8/2003 | Arlinsky et al. | |
| 2004/0043365 A1 | 3/2004 | Kelley et al. | |
| 2004/0081110 A1 | 4/2004 | Koskimies | |
| 2004/0087242 A1 | 5/2004 | Hagerman et al. | |
| 2004/0127140 A1 | 7/2004 | Kelly et al. | |
| 2004/0191741 A1 | 9/2004 | Ferringno et al. | |
| 2004/0197757 A1 | 10/2004 | Musolf | |
| 2004/0203317 A1 | 10/2004 | Small | |
| 2004/0214642 A1 | 10/2004 | Beck | |
| 2004/0259465 A1 | 12/2004 | Wright et al. | |
| 2005/0009610 A1 | 1/2005 | Miyamoto et al. | |
| 2005/0048457 A1 | 3/2005 | Ferringno et al. | |
| 2005/0216936 A1 | 9/2005 | Knudson et al. | |

FOREIGN PATENT DOCUMENTS

| | | |
|---|---|---|
| GB | 2 275 207 A | 8/1994 |
| KR | 10-2003-0057497 | 7/2003 |
| WO | WO 84/00503 | 2/1984 |
| WO | WO 99/64657 | 12/1999 |
| WO | WO 00/09229 | 2/2000 |
| WO | WO 01/97937 | 12/2001 |
| WO | WO 02/47013 | 6/2002 |
| WO | WO 2004/006197 | 1/2004 |
| WO | WO 2004/054123 | 6/2004 |

OTHER PUBLICATIONS

ISR/Written Opinion from PCT/US07/79566 dated Sep. 15, 2008.
ISR/Written Opinion from PCT/US07/16549—Aug. 21, 2008.
Extended European Search Report dated Aug. 20, 2007 for corresponding EP Application No. 06021643.9.
ISR/Written Opinion from corresponding PCT/US08/057124—dated Jul. 29, 2008.
ISR/Written Opinion from corresponding PCT/US08/80621—dated Jul. 31, 2008.

* cited by examiner

INTERACTIVE CLOTHING SYSTEM

RELATED CASES

This is a continuation-in-part of co-pending Ser. No. 11/540,369, filed Sep. 29, 2006, which is a continuation-in-part of co-pending Ser. No. 11/368,300, filed Mar. 3, 2006, which is a continuation-in-part of co-pending Ser. No. 11/255,852, filed Oct. 21, 2005 now abandoned, whose entire disclosures are incorporated by this reference as though set forth fully herein.

BACKGROUND OF THE INVENTION

1. Field of the Invention

The present invention relates to clothing and clothing accessories, and in particular, to an interactive clothing system.

2. Description of the Prior Art

Clothing and accessories have been used primarily for providing warmth, adornment and style to a person's body. Rarely have clothing and accessories been used to provide additional functions, such as for measurements, games or other amusement activities.

SUMMARY OF THE DISCLOSURE

It is an object of the present invention to provide an interactive system which allows the user to interact with an article of clothing.

It is another object of the present invention to provide an interactive system which allows the user to enact an activity or game using an article of clothing.

In order to accomplish the objects of the present invention, the present invention provides an interactive clothing system which includes a control unit having a processor and an antenna, and an item of clothing having a controller and a antenna. The antenna at the item of clothing communicates signals to the antenna at the control unit, the signals containing information about the item of clothing.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides an interactive clothing system which provides the user with entertainment or other functional operations. More specifically, the present invention provides a clothing system 20 which can help the user to measure or monitor environmental conditions, or which can be utilized by the user for games or other amusement activities.

Figure 1:
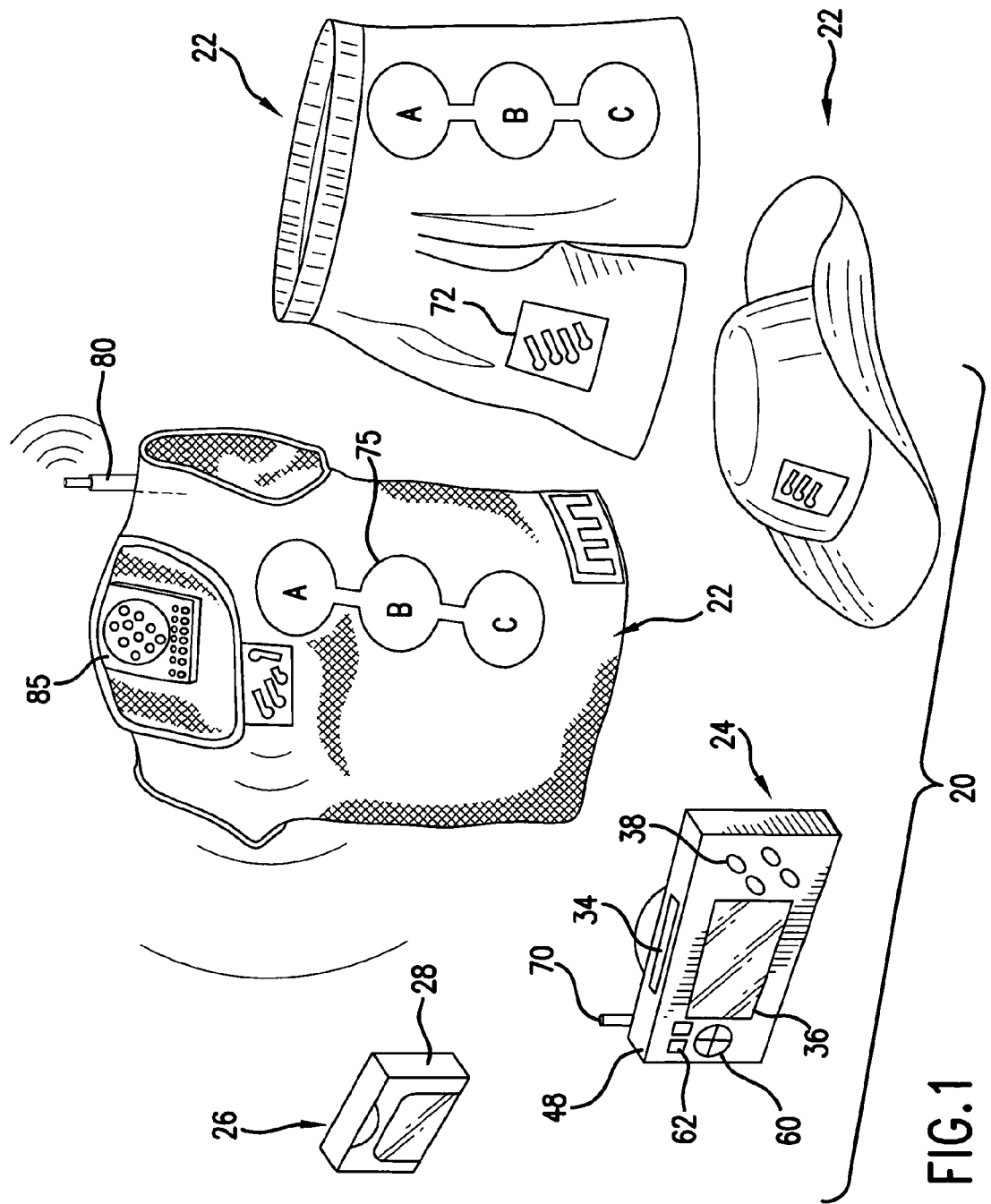
FIG. 1 is an exploded perspective view of an interactive clothing system according to one embodiment of the present invention.

FIG. 1 illustrates the basic components of an interactive system 20 according to one embodiment of the present invention. In its most basic form, the system 20 includes an article of clothing 22, a hand-held unit 24 and a storage device 26. The clothing 22 can be a shirt, a vest, a hat, a pair of trousers, or any other conventional article of clothing or accessory. The system 20 can include more than one item of clothing 22, but for simplicity's sake, the present invention will be described hereinbelow in the context of one article of clothing 22.

The storage device 26 can have a housing 28 that houses any conventional and well-known medium that includes a memory 30 (see FIG. 2) for storing digital data. The memory 30 can be embodied in the form of a memory card or cartridge or any other conventional storage medium, including a RAM, a ROM, or any writeable memory. The housing 28 can be configured to include a communication (e.g., input/output) port 32 which is adapted to be removably coupled to a communication (e.g., input/output) port 34 at the hand-held unit 24. The memory 30 can be adapted to store programs (software) for controlling the operation of the hand-held unit 24, as described below. The memory 30 can also be adapted to store data that can be transferred to the hand-held unit 24. Such data can include verbal or written messages, pre-recorded statements, sounds, music, light shows and other similar responses that can be displayed on the display screen 36 at the hand-held unit 24, or emitted from the speaker 38 at the hand-held unit 24. As used herein, the display screen 36 and the speaker 38 are mechanisms used by the system 20 to present a message. In addition, the system 20 can provide a plurality of different storage devices 26, with each storage device 26 storing software and/or data for different applications. For example, one storage device 26 can contain software and data directed to an environmental application (e.g., for measuring and broadcasting temperature or other environmental conditions), another storage device 26 can contain software and data directed to an entertainment application (e.g., for playing certain music or a video), and another storage device 26 can contain software and data directed to a game, among others. The player can vary his/her play variety by selecting the desired storage device 26 for a desired application.

In addition, the storage device 26 can be coupled to a personal computer PC (see FIG. 2) to download new programs (either from the PC or from the Internet) that can be used to play the system 20. In this regard, the storage device 26 can be embodied in the form of a CD, a cartridge or other diskette.

The electronics (see FIG. 2) of the hand-held unit 24 includes a processor 56 and a memory 58. The memory 58 can be used to store basic operating instructions for the processor 56, in which case the memory 58 can be embodied in the form of a ROM. Alternatively, the memory 58 can be used to store some or all of the programs, with the memory 30 on the storage device 26 used primarily for storing data that can be utilized to control or change the operation parameters of the programs stored in the memory 58. The communication port 34, the speaker 38 and the display screen 36 are provided in the housing 48 of the hand-held unit 24, and are all coupled to the processor 56. The housing 48 can also include a control pad 60 and control buttons 62. The port 34 functions to allow data and instructions to be transferred from the memory 30 in the storage device 26 to the processor 56 in the housing 48. The screen 36 functions to display words, images, colors, and patterns that are in response to instructions or data provided by the storage device 26 or the clothing 22. The speaker 38 emits sounds to provide vocal instructions and music. The speaker 38 and the screen 36 are both controlled by the processor 56. The control pad 60 and the buttons 62 are coupled to the processor 56 to provide control signals to the processor 56, so that the player can control the operation of the system 20 by controlling the pad 60 and the buttons 62. For example, the player can press selected buttons 62, or control the pad 60, to select desired modes or features, or to perform any of the operational functions described hereinbelow.

Figure 2:
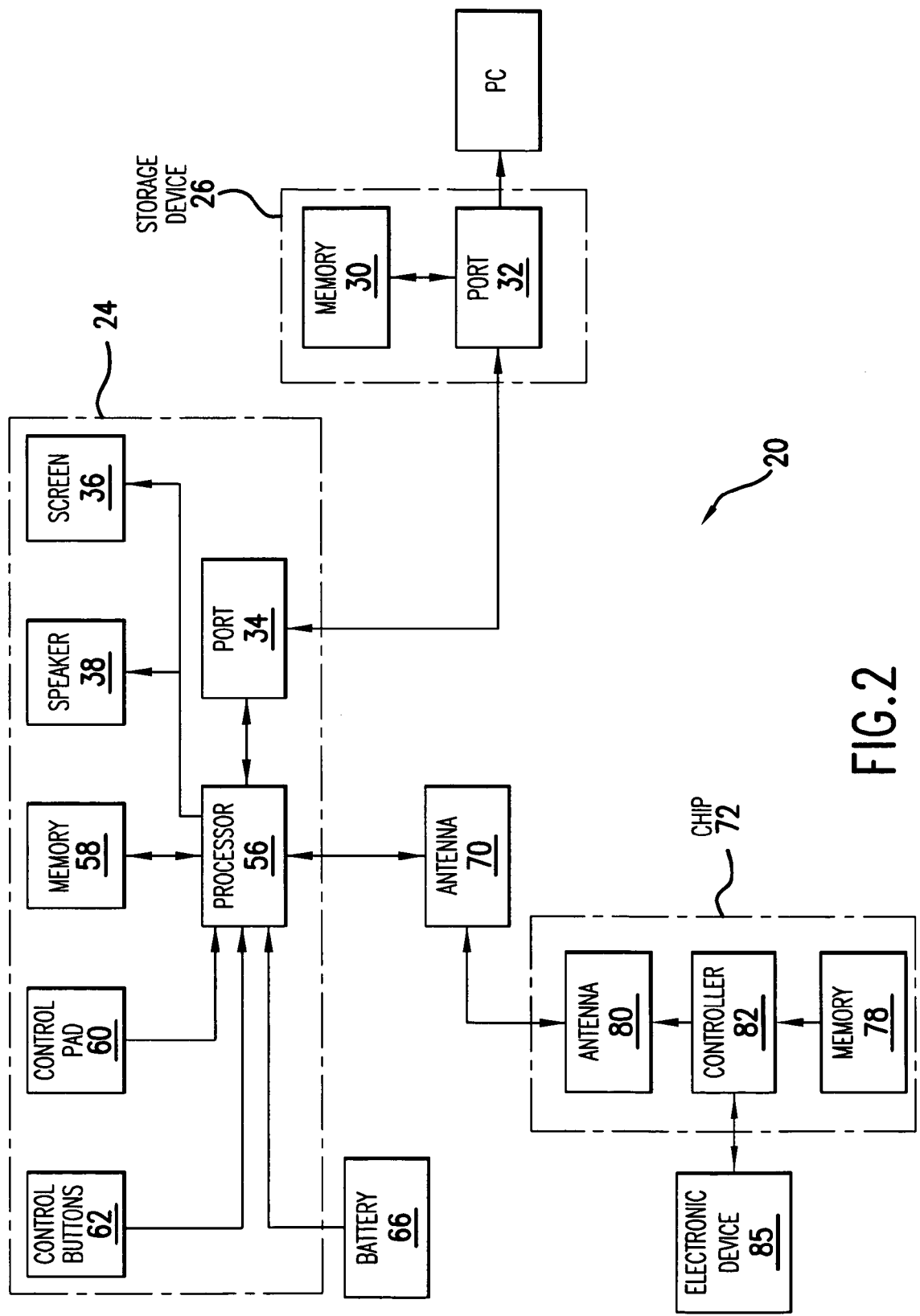
FIG. 2 is a block diagram illustrating the electrical components of the system of FIG. 1.

In addition, an antenna 70 can be provided in the housing 48, with the antenna 70 coupled to the electronics shown in FIG. 2. In addition, the housing 48 can be provided with a battery compartment accessed by a battery cover (not shown). Conventional batteries 66 (see FIG. 2) can be housed inside the battery compartment, and coupled to the electronics to power the operation of the hand-held unit 24.

Even though the term "hand-held" is used to describe the unit 24, the unit 24 can be hand-held, or can be a main unit that is secured to any stationary or larger object, such as the dashboard of an automobile, a cabinet or piece of furniture, the wall of a building, etc. As described herein, the unit 24 is essentially a control unit.

The clothing 22 is provided with a chip 72 that allows for the clothing 22 to communicate with the hand-held unit 24. For example, FIG. 2 illustrates a chip 72 that can be provided for use with an article of clothing 22. The chip 72 includes a memory 78 that is coupled to a controller 82 that is in turn coupled to an antenna 80. The antenna 80 is adapted to communicate with the electronics in the hand-held unit 24 via the antenna 70 in the housing 48. The memory 78 in the chip 72 contains data which is relevant to the designated activity, and can include, but is not limited to information relating to the article of clothing 22, the game being played, a condition being measured (e.g., temperature), etc. This data or information can be transferred from the memory 78 to the hand-held unit 24 to activate different responses (e.g., verbal or written messages, pre-recorded statements, sounds, music, light shows, etc.) that can be displayed on the display screen 36, or emitted from the speaker 38, at the hand-held unit 24. As a further alternative, the memory 78 in the chip 72 can even contain programs relating to different activities that the user can engage in, and these programs can be transferred to the processor 56 during operation.

An electronic device 85 can be attached to the clothing 22, and electrically coupled to the controller 82. The electronic device 85 can be a sensing device (e.g., a temperature sensor for measuring temperature, a CCD sensor for capturing images), or a speaker, or a display screen, among others.

The clothing 22 can also include patches of conductive ink that are well-known in the art. For example, in FIG. 1, the clothing 22 can be provided with patches of conductive ink 75 which can incorporate circuitry and even an antenna, as is well-known in the art. Thus, the conductive ink 75 can be used in lieu of the chip 72.

The system 20 operates in the following general manner according to one non-limiting embodiment of the present invention. The clothing 22 communicates with the unit 24 via the antennas 80 and 70. The processor 56 in the unit 24 receives these communications from the antenna 70, and then displays images at the display screen 36 and broadcasts sounds or music at the speaker 38 that are dependent upon the data being communicated by the clothing 22 to the unit 24. The communication can be initiated by either the controller 82 or the processor 56, with the initiating controller 82 or processor 56 directing a communication signal to be sent via the antennas 70, 80 to the other of the processor 56 or controller 82. Any of the conventional communication protocols can be used to facilitate the initiation of the communication, and the continued communication between, the processor 56 and the controller 82.

Figure 4:
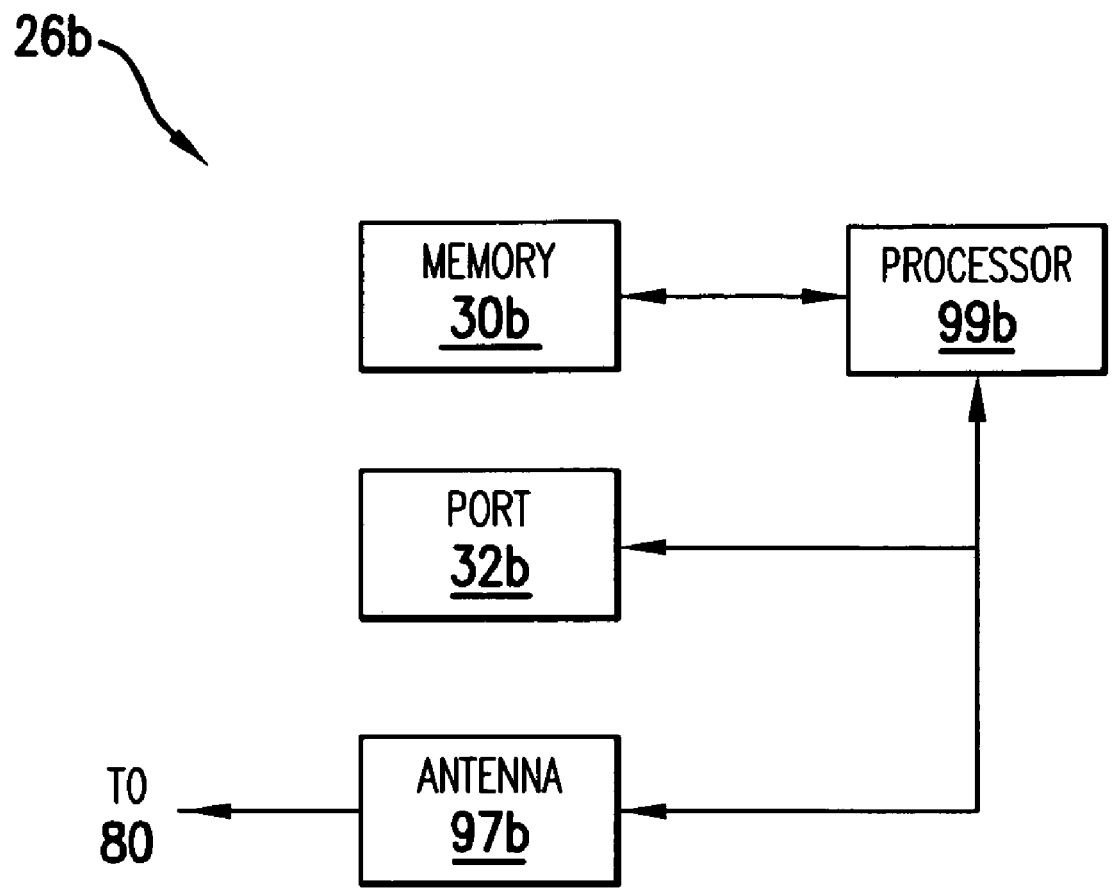
FIG. 4 is a block diagram illustrating a modification that can be made to the storage device of FIGS. 1 and 2.

The storage device 26 can provide another alternative form of communication. In this embodiment, the storage device 26b can further include an antenna 97b that is coupled to a processor 99b inside the storage device 26b, as best shown in FIG. 4. The clothing 22 can communicate with the storage device 26b via the antenna 80 at the clothing 22 and the antenna 97b at the storage device 26b. The processor 99b in the storage device 26b receives these communications from the antenna 97b, and then communicates with the unit 24 via the ports 32b and 34. The memory 30b can be coupled to the processor 99b. The memory 30b and the port 32b can be the same as the memory 30 and the port 32, respectively.

The following are some examples illustrating how the interactive clothing system 20 can be used.

Example 1

The electronic device 85 can be a camera which takes photographs when actuated by a switch (not shown) provided on the clothing 22 and electrically coupled to the camera. The captured image(s) can then be transmitted (via the antennas 80 and 70) to the processor 56 to be displayed by the display screen 36. The captured image(s) can even be stored in the memory 78, or transferred to the memories 58 and/or 30. This camera can be a hidden camera that appears to be a badge or accessory that is part of the clothing item 22, and be suited for use in police or investigative work. The camera can even be positioned on the rear of a shirt or trouser so that the user can hold the unit 24 as he/she is walking so that he/she can see if anyone is following him/her without turning the head. If used in this manner, the camera can operate as a safety device.

Example 2

The electronic device 85 can be a thermometer which measures the temperature of the environment. The measured temperature(s) can be stored in the memory 78, and/or transmitted (via the antennas 80 and 70) to the processor 56 to be displayed by the display screen 36 or broadcast by the speaker 38. In one application, the program in the memory 58 that is executed by the processor 56 will only broadcast or display a temperature only if the temperature exceeds or falls below a certain threshold. Thus, in this application, the system 20 will be used as a warning or notification device that notifies the user of a potentially dangerous situation. For example, a mountain-climber might wear a jacket having the chip 72, with the electronic device 85 measuring the temperature, wind chill, wind speed or other environmental condition, and then issuing a warning at the unit 24 if a particular condition exceeds or falls below a certain threshold. The captured environmental condition can even be stored in the memory 78, or transferred to the memories 58 and/or 30.

Example 3

The system 20 can be used to match the colors or styles of different items of clothing 22, or to locate items of misplaced clothing. In this Example, the electronic device 85 on the clothing 22 can be a sensor that will detect the motion, environment, or other measurable characteristic, and will convey the information to the hand-held unit 24 via the antennas 70 and 80.

For example, a clothing line can provide chips 72 in all of its clothing 22 sold to customers. Each item of clothing 22 has a chip 72, with the memory 78 in the chip 72 pre-programmed to contain information about that particular item of clothing 22 and that line of clothing. For example, the designer can pre-program certain desired matches (e.g., a particular top with a particular skirt or a particular pair of shoes), and certain undesirable matches, into the memory 58 at the unit 24 or even in the memory 30 at the storage device 26. When a user puts on two or more items of clothing 22 from the same line, the controller 82 in the chip 72 at the items of clothing 22 will communicate their identities to the processor 56 at the unit 24 (via the antennas 80 and 70), and the processor 56 will determine whether the selected clothing items are a desirable match, and communicate to the user via the speaker 38 or the display screen 36.

The user can also use this system to locate misplaced clothing 22. For example, the identities of all clothing items having a chip 72 can be stored in the memory 58 or the memory 30. If the user cannot find a particular item of clothing 22, the user can use the control pad 60 and control buttons 62 on the unit 24 to instruct the processor 56 to locate the clothing 22. The processor 56 would then communicate with the controller 82 (via the antennas 70 and 80) on the particular clothing 22, and the controller 82 would cause a speaker (i.e., an electronic device 85) to emit beeps or other sounds so that the user can be led to the location of the clothing 22.

Example 4

The system can be used as a single user game. The clothing 22 can contain a number of touch pads provided in different colors (i.e., as an electronic device 85), and a game can be stored in any of the memories 30, 58 and 78. The unit 24 can broadcast instructions via its display screen 36 or its speaker 38, such as "touch the red patch" or "touch the green patch", and the user will attempt to touch the correct touch pad, earning points for each successful touch. The electronic device 85 on the clothing 22 can also include a sensor that will detect the motion, environment, or other measurable characteristic, and will convey the information to the hand-held unit 24 via the antennas 70 and 80.

The same game can be modified to be more educational, for example, by providing touch pads on different parts of a long-sleeve shirt. The unit 24 can broadcast instructions via its display screen 36 or its speaker 38, such as "touch your shoulder", or "touch your chest" or "touch your back", and the child will attempt to touch a correct touch pad that is located at the correct body area, earning points for each successful touch. This game can be effective in teaching toddlers their body parts.

Example 5

The system can be used as a multi-user game. A game can be stored in either the memory 30 or the memory 58. A first player wears the clothing 22, and a second player controls the unit 24. The first player can attempt to run around in an irregular (or regular) manner, and the first player's movement will be displayed on the display screen 36 (via communication through the antennas 80, 70 and the processor 56). Many different games can be played based on tracking the movement of the first player. For example, the second player can manipulate the control buttons 62 and the control pad 60 in an attempt to catch the image of the first player on the display screen 36. As another example, the game can be a version of a "hide-and-seek" game where the second player cannot see where the first player is, but can track the location of the first player on the display screen 36. These games can be extended to more than two players, where two or more players, each wearing a different clothing 22, can be moving around and being tracked by a separate player who manipulates the unit 24. The electronic device 85 on the clothing 22 can also include a sensor that will detect the motion, environment, or other measurable characteristic, and will convey the information to the hand-held unit 24 via the antennas 70 and 80.

Example 6

The system 20 can be used in lieu of security tags on merchandise. Each merchandise can contain a chip 72, and when a purchaser pays for the clothing 22, the cashier utilizes a main unit 24 to identify the clothing 22 that is being purchased, which will disable an alarm (e.g., the electronic device 85). If a thief removes the clothing 22 from the store without disabling the alarm, then the alarm will activate when the thief passes the security zone.

Example 7

Figure 3:
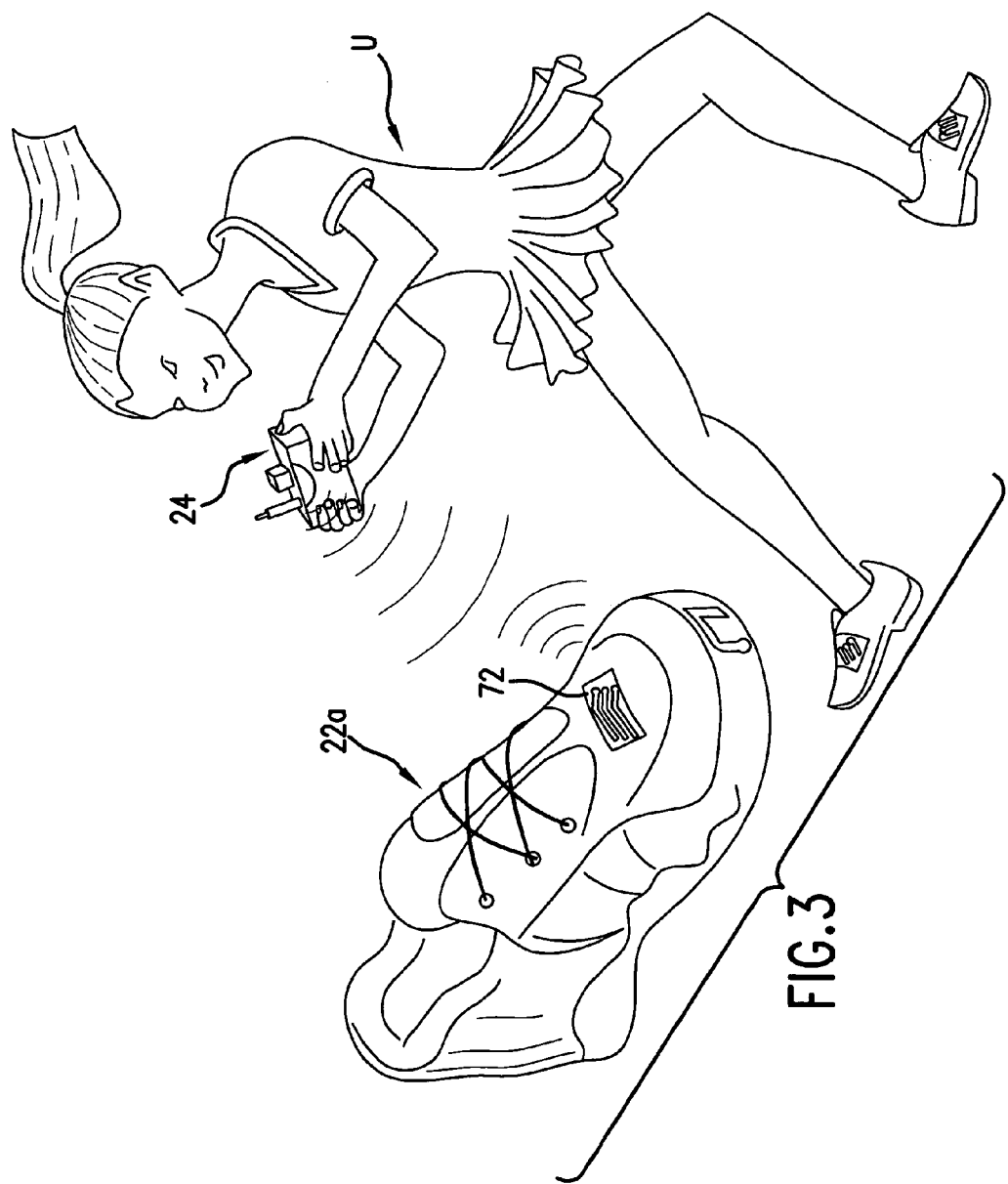
FIG. 3 is an exploded perspective view illustrating one example of the operation of the interactive clothing system of FIG. 1.

FIG. 3 illustrates how the system 20 can be implemented when the article of clothing 22 is a pair of shoes 22a. The shoe 22a can have a chip 72a that can be the same as the chip 72. As shown in FIG. 3, the user U can wear the shoe 22a during an activity, such as dancing, jogging, and walking, among others. The electronic device 85 on the shoe 22a can be a sensor that will detect the motion, environment, or other measurable characteristic, and will convey the information to the hand-held unit 24 via the antennas 70 and 80.

For example, the system can be used as part of a real-time virtual simulation system where the user U wears the shoe 22a and goes on a walk or a jog. As the user U walks, the sensor detects the speed of the walking or jogging motion, and communicates with the unit 24 to display images on the display screen 36 correlating to the motion. The images can depict the user walking through a scenic forest, or a hiking trail, or other virtual scene. The speed through which the user is shown navigating through the scene will depend upon the speed of the motion of the shoe 22a. The speaker 38 can be used to broadcast soothing and relaxing music relating to the activity or scene.

As another example, the system can be used to detect environmental characteristics associated with the ground. In this example, the user U wears the shoe 22a and the sensor detects the temperature or other environmental characteristic, which is then communicated to the unit 24 where it can be displayed on the display screen 36 or broadcast via the speaker 38.

As yet another example, the system can be used to simulate a dance performance. In this example, the user U wears the shoe 22a and begins a dance routine. As the user U dances, the sensor detects the dancing motion, and communicates with the unit 24 to display images on the display screen 36 correlating to the dancing motion. The images can depict the user doing his/her dance routine, while the speaker 38 can be used to broadcast music that accompanies the selected dance.

In all the above embodiments and Examples, the processor 56 can also recognize and store information relating to the programs selected by the player, play patterns of the player, or anything related to the use and play of the system 20. This information can be transferred to the memory 30 in the storage device 26 via ports 34 and 32. The player can select such recognition and storage functions by manipulating the control buttons 62 and/or the control pad 60. The information in the memory 30 can then be transferred by the storage device 26 to a PC where the information can be analyzed, processed and stored for any desired purpose.

The system 20 can even be modified to include a PC and a PC monitor. The antenna 70 on the unit 24 can communicate signals with an antenna on the PC or other computer, and the images displayed on the screen 38 can be replicated on the monitor. The PC can even be used to store programs, and to transfer programs to the unit 24 for execution thereat.

As a further example, the PC can be used to connect to the Internet for communicating with other units 24 at distant locations. For example, some of the activities described hereinabove for the system 20 can be controlled by a user at a distant or remote location. One example is the multi-user game described in Example 5 above. The second player can be in a remote or distant location with the signals being communicated from the clothing 22 worn by the first player to the unit 24 located near the first player, and then from the unit 24 to a PC which then transmits these signals via the Internet to a PC where the second player is located.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of communicating information from an item of clothing, comprising:
   providing a control unit having a processor and a first antenna;
   providing an item of clothing having a controller, an image capturing device and a second antenna;
   receiving information from the image capturing device as the item of clothing moves from one location to another location; and
   communicating signals from the controller and the second antenna to the first antenna and the processor, the signals containing the information received by the image capturing device;
   wherein the signals represent images.

2. The method of claim 1, further including:
   displaying the information at the control unit.

3. The method of claim 1, further including the step of storing the information at a memory at the controller.

4. The method of claim 1, further including the step of storing the information at a memory at the processor.

\* \* \* \* \*